United States Patent
Eoff et al.

(10) Patent No.: US 6,497,283 B1
(45) Date of Patent: Dec. 24, 2002

(54) WELL CEMENT ADDITIVES, COMPOSITIONS AND METHODS

(75) Inventors: Larry S. Eoff, Duncan, OK (US); B. Raghava Reddy, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 09/988,970

(22) Filed: Nov. 19, 2001

(51) Int. Cl.$^7$ ................................................ E21B 33/13
(52) U.S. Cl. ........................................ 166/293; 166/294
(58) Field of Search .................................. 166/293, 294

(56) References Cited

U.S. PATENT DOCUMENTS

| | | | |
|---|---|---|---|
| 4,011,909 A | 3/1977 | Adams et al. ............... | 166/293 |
| 4,015,991 A | 4/1977 | Persinski et al. ............ | 106/90 |
| 4,022,731 A | 5/1977 | Schmitt ................. | 260/29.6 E |
| 4,515,635 A | 5/1985 | Rao et al. ...................... | 106/90 |
| 4,555,269 A | 11/1985 | Rao et al. ...................... | 106/90 |
| 5,110,853 A | 5/1992 | Van-Det et al. ............. | 524/375 |
| 5,149,370 A | 9/1992 | Olaussen et al. ........... | 106/737 |
| 5,431,783 A | 7/1995 | Hoing ..................... | 162/164.4 |
| 5,480,921 A | 1/1996 | Hunter et al. ................ | 523/331 |
| 5,547,506 A | 8/1996 | Rae et al. .................... | 106/730 |
| 6,268,406 B1 | 7/2001 | Chatterji et al. ............ | 523/130 |
| 6,414,080 B1 * | 7/2002 | Loeffler et al. ............. | 524/801 |

FOREIGN PATENT DOCUMENTS

| | | |
|---|---|---|
| EP | 0 157 055 A2 | 10/1985 |
| EP | 0 538 989 A2 | 3/1993 |

* cited by examiner

*Primary Examiner*—Paul Marcantoni
(74) *Attorney, Agent, or Firm*—Craig W. Roddy; C. Clark Dougherty, Jr.

(57) ABSTRACT

Improved well cement additives, compositions and methods of using the compositions are provided. The well cement additives are basically comprised of a first monomer selected from the group of 2-acrylamido-2-methylpropane sulfonic acid, 2-allyloxy-2-hydroxy-1-propane sulfonic acid and vinylsulfonic acid, a second monomer selected from the group of N,N-dimethylacrylamide, acrylamide, N-vinylpyrrolidone, N-vinylacetamide and acrylonitrile and a third monomer selected from the group of $C_6$ to $C_{22}$ dimethylaminopropylmethacrylamide bromide, chloride and iodide and $C_6$ to $C_{22}$ dimethylaminoethylmethacrylate bromide, chloride and iodide.

13 Claims, No Drawings

WELL CEMENT ADDITIVES, COMPOSITIONS AND METHODS

BACKGROUND OF THE INVENTION

1. Field of the Invention

The present invention relates to subterranean well cementing operations, and more particularly, to improved well cement composition fluid loss control additives, well cement compositions containing the additives and methods of using the compositions.

2. Description of the Prior Art

Hydraulic cement compositions are commonly utilized in subterranean well completion and remedial operations. For example, hydraulic cement compositions are used in primary cementing operations whereby strings of pipe such as casings and liners are cemented in well bores. In performing primary cementing, a hydraulic cement composition is pumped into the annular space between the walls of a well bore and the exterior surfaces of a pipe string disposed therein. The cement composition is permitted to set in the annular space thereby forming an annular sheath of hardened substantially impermeable cement therein which supports and positions the pipe string in the well bore and bonds the exterior surfaces of the pipe string to the walls of the well bore. Hydraulic cement compositions are also utilized in remedial cementing operations such as plugging highly permeable zones or fractures in well bores, plugging cracks or holes in pipe strings and the like.

Fluid loss control agents are used in well cement compositions to reduce fluid loss from the cement compositions to permeable formations or zones into or through which the cement compositions are pumped. In primary cementing, the loss of fluid, i.e., water, to permeable subterranean formations or zones can result in premature gelation of the cement compositions whereby bridging of the annular space between the permeable formation or zone and the pipe string being cemented prevents the cement compositions from being placed over the entire length of the annulus. A number of fluid loss control additives have been utilized in well cement compositions heretofore. A particularly useful cement composition fluid loss control additive is described in U.S. Pat. No. 4,555,269 issued to Rao et al. on Nov. 26, 1985 which is assigned to the assignee of this present invention. The fluid loss control additive is comprised of copolymers and copolymer salts of N,N-dimethylacrylamide and 2-acrylamido-2-methylpropane sulfonic acid having molecular weights of between about 75,000 and 300,000.

While the above well cement composition fluid loss control additive and other heretofore known fluid loss control additives have functioned successfully, there are continuing needs for improved well cement composition fluid loss control additives which bring about less fluid loss while maintaining static cement gel strength properties, well cement compositions including the additives and methods of using the compositions.

SUMMARY OF THE INVENTION

The present invention provides well cement composition fluid loss control additives, well cement compositions including the additives and methods of using the compositions which meet the needs described above and overcome the deficiencies of the prior art. The improved well cement composition fluid loss control additives are comprised of terpolymers having molecular weights in the range of from about 75,000 to about 300,000. The terpolymers are comprised of first, second and third monomers wherein the first monomer is selected from the group of 2-acrylamido-2-methylpropane sulfonic acid, 2-allyloxy-2-hydroxy-1-propane sulfonic acid and vinylsulfonic acid, the second monomer is selected from the group of N,N-dimethylacrylamide, acrylamide, N-vinylpyrrolidone, N-vinylacetamide and acrylonitrile and the third monomer is selected from the group of $C_6$ to $C_{22}$ dimethylaminopropylmethacrylamide bromide, chloride and iodide and $C_6$ to $C_{22}$ dimethylaminoethylmethacrylate bromide, chloride and iodide. A preferred such fluid loss control additive is comprised of a terpolymer of 2-acrylamido-2-methylpropane sulfonic acid, N,N-dimethylacrylamide and hexadecyldimethylaminopropylmethacrylamide bromide.

The improved cement compositions of this invention are basically comprised of a hydraulic cement, sufficient water to form a slurry and a terpolymer fluid loss control additive of this invention.

The methods of this invention for cementing a zone in a subterranean formation penetrated by a well bore are basically comprised of the steps of providing a cement composition of this invention as described above, placing the cement composition in the zone to be cemented and allowing the cement composition to set into an impermeable solid mass therein.

It is, therefore, an object of this invention to provide improved well cement fluid loss control additives, cement compositions containing the additives and methods of using the compositions.

Other and further objects, features and advantages of the present invention will be readily apparent to those skilled in the art upon a reading of the description of preferred embodiments which follows.

DESCRIPTION OF PREFERRED EMBODIMENTS

The improved fluid loss control additives for use in the well cement compositions of this invention are basically comprised of terpolymers having molecular weights in the range of from about 75,000 to about 300,000. An example of a particularly preferred well cement fluid loss control additive is a terpolymer comprised of 2-acrylamido-2-methylpropane sulfonic acid, N,N-dimethylacrylamide and hexadecyldimethylaminopropylmethacrylamide bromide, chloride or iodide. This fluid loss control additive provides superior reductions in fluid loss from well cement compositions without compromising the static gel strength properties of the cement compositions during setting. While the hexadecyl dimethylammonium propylmethacrylamide bromide monomer adds a hydrophobic hydrocarbon chain having 16 carbon atoms to the terpolymer, the monomer has an ionic charge that gives it water solubility. In addition, the monomer gives the terpolymer unique associative properties which provide increased effectiveness to the terpolymer as a well cement composition fluid loss control additive and, as mentioned, provides increased static cement gel strength properties to the cement composition. Since the hexadecyl dimethylammonium propylmethacrylamide bromide monomer is water soluble, the terpolymer can be synthesized in an aqueous solution. The terpolymer can also be made in the form of an emulsion.

The hexadecyldimethylaminopropylmethacrylamide bromide, chloride or iodide monomer which is utilized to form the fluid loss control additive terpolymer can be prepared by adding an equi-molar mixture of dirnethylaminopropylmethacrylamide and hexadecylbromide, chloride or iodide to a flask heated to 60° C. with stirring and held for 24 hours. To this mixture is added an appropriate solvent, such as petroleum ether, which is miscible with the starting materials and will precipitate the product monomer, i.e., hexadecyldimethylaminopropylmethacrylamide bromide, chloride or iodide. The product can be collected on a Buchner funnel, washed with more petroleum ether, dried, and used in subsequent polymerization reactions.

The terpolymer can be prepared by dissolving in water the monomers 2-acrylamido-2-methylpropane sulfonic acid (AMPS), N,N-dimethylacrylamide and hexadecyldimethylaminopropylmethacrylamide ($C_{16}$ DMAPMA) bromide, chloride or iodide in amounts to give a 10% active solution. To this solution, an appropriate amount of polymerization initiator, such as 2,2'-azobis(2-amidinopropane) dihydrochloride, is added. The solution is then heated to initiate polymerization and to form a solution of the -terpolymer. The AMPS/NNDMA/$C_{16}$DMAPMA bromide, chloride or iodide terpolymer preferably has an AMPS to NNDMA to $C_{16}$ DMAPMA Br, Cl or I mole ratio of 59.5:39.5:1.

A preferred improved well cement composition of the present invention is basically comprised of a hydraulic cement, sufficient water to form a slurry and a fluid loss control additive comprising a terpolymer of 2-acrylamido-2-methylpropane sulfonic acid, N,N-dimethylacrylamide and hexadecyldimethylaminopropylmethacrylamide bromide, chloride or iodide.

In addition to the monomers described above, various other first, second and third monomers can be utilized to form terpolymer fluid loss control additives of this invention. The monomers that can be utilized to form the terpolymers of this invention and which provide improved fluid loss control and static gel strength to well cement compositions are set forth in Table I below.

sulfonic acid/N,N-dimethylacrylamide/$C_6$–$C_{22}$ dimethylaminoethyl-methacrylate bromide, chloride or iodide; 2-acrylamido-2-methylpropane sulfonic acid/acrylamide/$C_6$–$C_{22}$ dimethylaminoethylmethacrylate bromide, chloride and iodide; 2-acrylamido-2-methylpropane sulfonic acid/N-vinylpyrrrolidone/$C_6$–$C_{22}$ dimethylaminoethylmethacrylate bromide, chloride or iodide; 2-acrylamido-2-methyl-propane sulfonic acid/N-vinylacetamide/$C_6$–$C_{22}$ dimethylaminoethylmethacrylate bromide, chloride or iodide; 2-acrylamido-2-methylpropane sulfonic acid/acrylonitrile/$C_6$–$C_{22}$ dimethylaminoethyl-methacrylate bromide, chloride and iodide; 2-allyloxy-2-hydroxy-1-propane sulfonic acid/N,N-dimethylacrylamide/ $C_6$ to $C_{22}$ dimethylaminopropylmethacrylamide bromide, chloride or iodide; 2-allyloxy-2-hydroxy-1-propane sulfonic acid/acrylamide/$C_6$ to $C_{22}$ dimethylaminopropylmethacrylamide bromide, chloride or iodide; 2-allyloxy-2-hydroxy-1-propane sulfonic acid/N-vinylpyrrolidone/$C_6$ to $C_{22}$ dimethylaminopropylmethacrylamide bromide, chloride or iodide; 2-allyloxy-2-hydroxy-1-propane sulfonic acid/N-vinylacetamide/$C_6$ to $C_{22}$ dimethylaminopropylmethacrylamide bromide, chloride or iodide; 2-allyloxy-2-hydroxy-1-propane sulfonic acid/acrylonitrile/$C_6$ to $C_{22}$ dimethylaminopropylmethacrylamide bromide, chloride or iodide; vinylphosphonic acid/N,N-dimethylacrylamide/$C_6$to $C_{22}$ dimethylaminopropylmethacrylamide bromide, chloride or iodide; vinylsulfonic acidlacrylamide/$C_6$ to $C_{22}$ dimethylaminopropylmethacrylamide bromide, chloride or iodide; vinylsulfonic acid/N-vinylpyrrolidone/$C_6$ to $C_{22}$ dimethylaminopropylmethacrylamide bromide, chloride or iodide; vinylsulfonic acid/N-vinylacetamide/$C_6$ to $C_{22}$ dimethylaminopropylmethacrylamide bromide, chloride or iodide; vinylsulfonic acid/acrylonitrile/$C_6$ to $C_{22}$ dimethylaminopropylmethacrylamide bromide, chloride or iodide; 2-allyloxy-2-hydroxy-1-propane sulfonic acid/N,N-dimethylacrylamide/$C_6$to $C_{22}$ dimethylaminoethylmethacrylate bromide, chloride or iodide; 2-allyloxy-2-hydroxy-1-propane sulfonic acid/acrylamide/$C_6$to $C_{22}$

TABLE I

Monomers For Forming Terpolymers Of The Present Invention

| First Monomers | Second Monomers | Third Monomers |
|---|---|---|
| 2-acrylamido-2-methylpropane sulfonic acid | N,N-dimethylacrylamide | $C_6$ to $C_{22}$ dimethylaminopropylmethacrylamide bromide, chloride or iodide |
| 2-allyloxy-2-hydroxy-1-propane sulfonic acid vinylsulfonic acid | Acrylamide N-vinylpyrrolidone | $C_6$ to $C_{22}$ dimethylaminoethylmethacrylate bromide, chloride or iodide |
| | N-vinyacetamide acrylonitrile | |

The terpolymers of the present invention that can be formed using the above monomers include, but are not limited to: 2-acrylamido-2-methylpropane sulfonic acid/N,N-dimethylacrylamide/$C_6$–$C_{22}$ dimethylaminopropylmethacrylamide bromide, chloride or iodide; 2-acrylamido-2-methylpropane sulfonic acid/acrylamide/$C_6$–$C_{22}$ di-methylaminopropylmethacrylamide bromide, chlorine or iodide; 2-acrylamido-2-methyl-propane sulfonic acid/N-vinylpyrrolidone/$C_6$–$C_{22}$ dimethylaminopropylmethacrylamide bromide, chloride or iodide; 2-acrylamido-2-methylpropane sulfonic acid/N-vinylacetamide/$C_6$–$C_{22}$ dimethylaminopropylmethacrylamide bromide, chloride or iodide; 2-acrylamido-2-methylpropane sulfonic acid/acrylonitrile/$C_6$–$C_{22}$ dimethylaminopropylmethacrylamide bromide, chloride or iodide; 2-acrylamido-2-methylpropane dimethylaminoethylmethacrylate bromide, chloride or iodide; 2-allyloxy-2-hydroxy-1-propane sulfonic acid/N-vinylpyfrolidone/$C_6$to $C_{22}$ dimethylaminoethylmethacrylate bromide, chloride or iodide; 2-allyloxy-2-hydroxy-1-propane sulfonic acid/N-vinylacetamide/$C_6$to $C_{22}$ dimethylaminoethylmethacrylate bromide, chloride or iodide; 2-allyloxy-2-hydroxy-1-propane sulfonic acid/acrylonitrile/ $C_6$to $C_{22}$ dimethylaminoethylmethacrylate bromide, chloride or iodide; vinylsulfonic acid/N,N-dimethylacrylamide/ $C_6$ to $C_{22}$ dimethylaminoethylmethacrylate bromide, chloride or iodide; vinylsulfonic acid/acrylamide/$C_6$ to $C_{22}$ dimethylaminoethylmethacrylate bromide, chloride or iodide; vinylsulfonic acid/N-vinylpyrrolidone/$C_6$ to $C_{22}$ dimethylaminoethylmethacrylate bromide, chloride or iodide; vinylsulfonic acid/N-vinylacetamide/$C_6$ to $C_{22}$ dimethylaminoethylmethacrylate bromide, chloride or iodide; and vinylsulfonic acid/acrylonitrile/$C_6$ to $C_{22}$ dimethylaminoethylmethacrylate bromide, chloride or iodide.

The forgoing terpolymers can all be formed as described above relating to the most preferred terpolymer, i.e., 2-acrylamido-2-methylpropane sulfonic acid/N,N-dimethylacrylamide/$C_{16}$ dimethylammonium propylmethacrylamide bromide.

A variety of hydraulic cements can be utilized in accordance with the present invention including those comprised of calcium, aluminum, silicon, oxygen and/or sulfur which set and harden by reaction with water. Such hydraulic cements include, but are not limited to, Portland cements, pozzolana cements, gypsum cements, aluminous cements and silica cements. Portland cements are generally preferred for use in accordance with the present invention, and Portland cements of the types defined and described in *API Specification For Materials And Testing For Well Cements*, API Specification 10, 5*th* Edition, dated Jul. 1, 1990 of the American Petroleum Institute are particularly preferred. API Portland cements include Classes A, B, C, G and H. API Classes G and H are preferred with Class G being the most preferred.

The water utilized in the compositions of this invention can be fresh water, unsaturated salt solutions and saturated salt solutions. Generally, the water can be from any source provided it does not contain an excess of compounds that adversely affect other components in the cement compositions. The water is present in the cement compositions of this invention in an amount sufficient to form a pumpable slurry. More particularly, the water is present in the cement compositions in an amount in the range of from about 37% to about 56% by weight of hydraulic cement therein.

As mentioned above, the fluid loss control additive terpolymer of this invention is comprised of a first monomer, most preferably 2-acrylamido-2-methylpropane sulfonic acid, a second monomer, most preferably N,N-dimethylacrylamide and a third monomer, most preferably hexadecyldimethylaminopropylmethacrylamide bromide. As also mentioned, a variety of other first, second and third monomers can be utilized including those listed above. Generally, the first monomer is present in the terpolymer in an amount in the range of from about 50 to about 70 mole percent, the second monomer is present in an amount in the range of from about 30 to about 50 mole percent and the third monomer is present in an amount in the range of from about 1 to about 10 mole percent. More preferably, the first monomer is present in the terpolymer in an amount in the range of from about 60 to about 70 mole percent, the second monomer is present in an amount in the range of from about 30 to about 40 mole percent and the third monomer is present in an amount in the range of from about 1 to about 5 mole percent. Generally, the terpolymer has a molecular weight in the range of from about 75,000 to about 300,000, most preferably a molecular weight of about 250,000.

The terpolymer fluid loss control additive is generally present in the well cement compositions of this invention in an amount in the range of from about 0.1% to about 2% by weight of hydraulic cement therein. As will be understood by those skilled in the art, the well cement compositions can include other conventional well cement additives such as set accelerating additives, set retarding additives, fillers, weighting materials, lightening materials and the like.

As will be understood by those skilled in the art, a variety of conventional additives can be included in the cement compositions of this invention including, but not limited to, set retarders, set accelerators, dispersants and lightweight additives such as microspheres, sodium silicate, bentonite and the like. When lightweight additives are included, the amount of water required in the cement compositions often increases.

The methods of the present invention for cementing a subterranean zone penetrated by a well bore are basically comprised of the steps of providing a cement composition of this invention as described above, placing the cement composition in the zone to be cemented and allowing the cement composition to set into an impermeable solid mass therein.

In order to further illustrate the cement compositions and methods of the present invention, the following example is given.

EXAMPLE

A cement slurry comprised of Portland Class H cement and fresh water in an amount of 42% by weight of cement was prepared. The cement slurry was divided into eight samples. To four of the samples, varying amounts of the above mentioned prior art fluid loss control additive comprised of a co-polymer of 2-acrylamido-2-methylpropane sulfonic acid and N,N-dimethylacrylamide in emulsion form were added. The preferred terpolymer fluid loss control additive of the present invention, i.e., a terpolymer of 2-acrylamido-2-methylpropane sulfonic acid/N,N-dimethylacrylamide/hexadecyldimethyl-aminopropylmethacrylamide bromide was added to four additional samples of the cement slurry in the same amounts as the prior art fluid loss control additive added to the first four cement slurry samples. A lignosulfonate set retarding additive and sodium chloride salt were also added to some of the cement slurry test samples. The cement slurry samples were tested for fluid loss in accordance with the procedure described in the above mentioned API Specification 10 at various temperatures.

The amounts of the various components in the cement slurry test samples and the results of the fluid loss tests are given in Table II below.

TABLE II

| | | Fluid Loss Test Results | | | | |
|---|---|---|---|---|---|---|
| Cement Composition Test Sample No. | Fluid Loss Control Additive Used | Quantity of Fluid Loss Control Additive, % by wt. of Cement | Set Retarding Additive,[3] % by wt. of Cement | Salt,[4] % by wt. of Cement | Temperature, °F. | Fluid Loss, ml/minutes |
| 1 | Prior Art[1] | 0.4 | — | — | 80 | 29/30 |
| 2 | Present Invention[2] | 0.4 | — | — | 80 | 19/30 |
| 3 | Prior Art | 0.6 | 0.2 | — | 140 | 55/25 |
| 4 | Present Invention[2] | 0.6 | 0.2 | — | 140 | 38/30 |
| 5 | Prior Art[1] | 0.6 | — | 5 | 140 | 56/4.5 |

TABLE II-continued

Fluid Loss Test Results

| Cement Composition Test Sample No. | Fluid Loss Control Additive Used | Quantity of Fluid Loss Control Additive, % by wt. of Cement | Set Retarding Additive,[3] % by wt. of Cement | Salt,[4] % by wt. of Cement | Temperature, °F. | Fluid Loss, ml/minutes |
|---|---|---|---|---|---|---|
| 6 | Present Invention[2] | 0.6 | — | 5 | 140 | 57/11 |
| 7 | Prior Art[1] | 0.8 | 0.4 | — | 180 | 55/20 |
| 8 | Present Invention[2] | 0.8 | 0.4 | — | 180 | 45/30 |

[1]AMPS/NNDMA fluid loss control additive commercially available from Halliburton Energy Services, Inc. of Duncan, Oklahoma under the trade designation "HALAD 700 ™."
[2]AMPS/NNDMA/$C_{16}$ DMAPMA Br terpolymer having a mole ratio of 59.5:39.5:1 and a molecular weight of about 250,000.
[3]Lignosulfonate set retarder commercially available from Halliburton Energy Services, Inc. of Duncan, Oklahoma under the trade designation "HR-5 ™."
[4]Sodium chloride.

From Table II it can be seen that the terpolymer fluid loss control additive of the present invention provides better fluid loss control than the prior art additive.

Thus, the present invention is well adapted to carry out the objects and attain the ends and advantages mentioned as well as those which are inherent therein. While numerous changes may be made by those skilled in the art, such changes are encompassed within the spirit of this invention as defined by the appended claims.

What is claimed is:

1. A method of cementing a subterranean zone penetrated by a well bore comprising the steps of:
    (a) providing a cement composition comprised of a hydraulic cement, sufficient water to form a slurry and a terpolymer fluid loss control additive comprised of first, second and third monomers wherein said first monomer is selected from the group consisting of 2-acrylamido-2-methylpropane sulfonic acid, 2-allyloxy-2-hydroxy-1-propane sulfonic acid and vinylsulfonic acid, said second monomer is selected from the group consisting of N,N-dimethylacrylamide, acrylamide, N-vinylpyrrolidone, N-vinylacetamide and acrylonitrile and said third monomer is selected from the group consisting of $C_6$ to $C_{22}$ dimethylaminopropylmethacrylamide bromide, chloride and iodide and $C_6$ to $C_{22}$ dimethylaminoethylmethacrylate bromide, chloride and iodide;
    (b) placing said cement composition in said zone to be cemented; and
    (c) allowing said cement composition to set into an impermeable solid mass therein.

2. The method of claim 1 wherein said first monomer is present in said terpolymer in an amount in the range of from about 50 to about 70 mole percent, said second monomer is present in said terpolymer in an amount in the range of from about 30 to about 50 mole percent and said third monomer is present in said terpolymer in an amount in the range of from about 1 to about 10 mole percent.

3. The method of claim 1 wherein said terpolymer is comprised of a 2-acrylamido-2-methylpropane sulfonic acid first monomer, a N,N-dimethylacrylamide second monomer and a $C_6$ to $C_{22}$ dimethylaminopropylmethacrylamide bromide, chloride or iodide third monomer.

4. The method of claim 3 wherein said first monomer is present in said terpolymer in an amount in the range of from about 50 to about 70 mole percent, said second monomer is present in said terpolymer in an amount in the range of from about 30 to about 50 mole percent and said third monomer is present in an amount in the range of from about 1 to about 10 mole percent.

5. The method of claim 1 wherein said terpolymer is comprised of a 2-acrylamido-2-methylpropane sulfonic acid first monomer, a N,N-dimethylacrylamide second monomer and a $C_{16}$ dimethylaminopropylmethacrylamide bromide.

6. The method of claim 5 wherein said first monomer is present in said terpolymer in an amount of about 59.5 mole percent, said second monomer is present in said terpolymer in an amount of about 39.5 mole percent and said third monomer is present in said terpolymer in an amount of about 1 mole percent.

7. The method of claim 1 wherein of claim 1 wherein said hydraulic cement in said cement composition is selected from the group consisting of Portland cements, pozzolana cements, gypsum cements, aluminous cements and silica cements.

8. The method of claim 1 wherein said hydraulic cement in said cement composition is Portland cement.

9. The method of claim 1 wherein said water in said cement composition is selected from the group consisting of fresh water, unsaturated salt solutions and saturated salt solutions.

10. The method of claim 1 wherein said water is present in said cement composition in an amount in the range of from about 37% to about 56% by weight of hydraulic cement therein.

11. The method of claim 1 wherein said fluid loss control additive terpolymer in said cement composition has a molecular weight in the range of from about 75,000 to about 300,000.

12. The method of claim 1 wherein said fluid loss control additive terpolymer in said cement composition has a molecular weight of about 250,000.

13. The method of claim 1 wherein said fluid loss control additive terpolymer is present in said cement composition in an amount in the range of from about 0.1% to about 2% by weight of hydraulic cement therein.

* * * * *